UNITED STATES PATENT OFFICE.

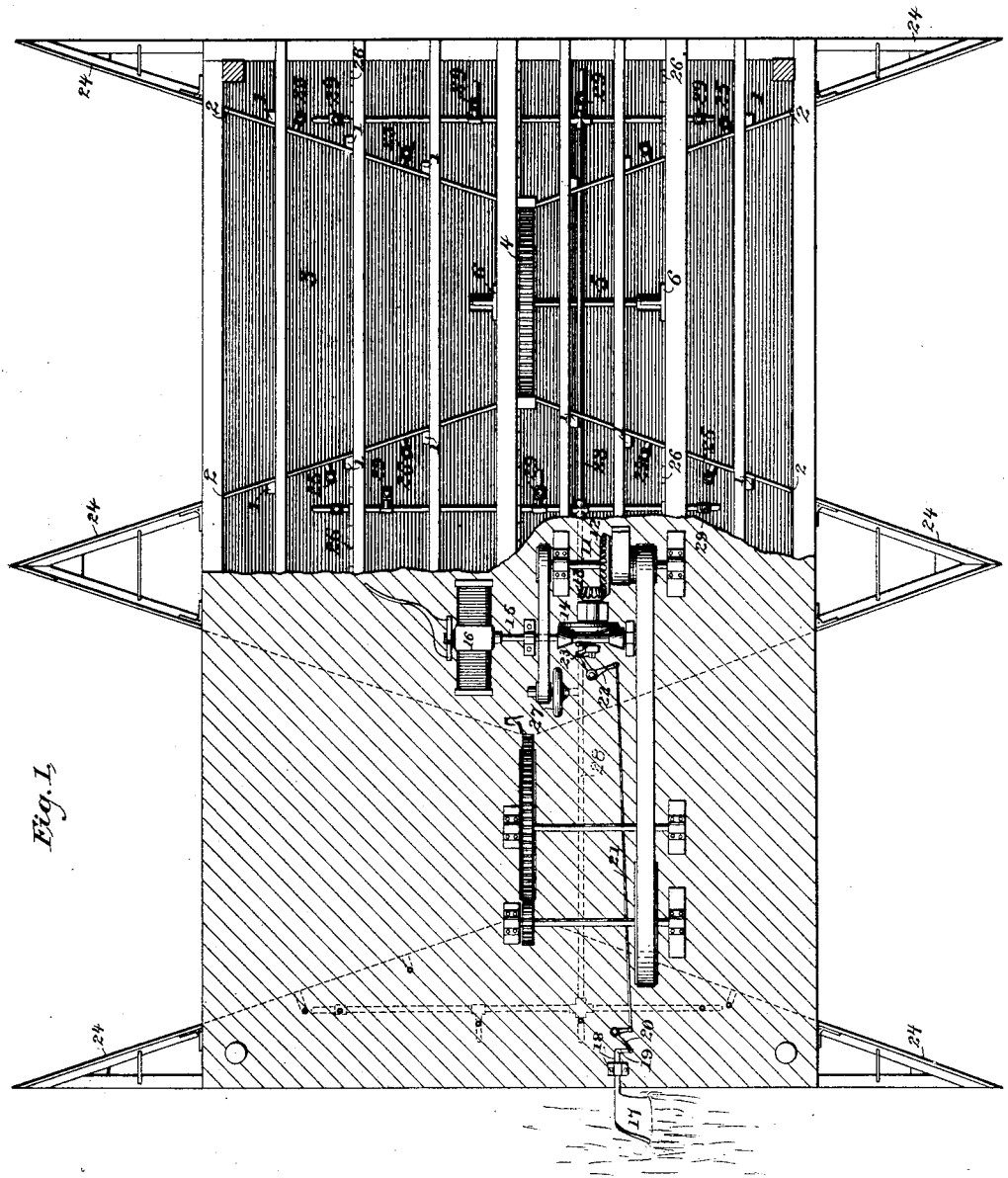

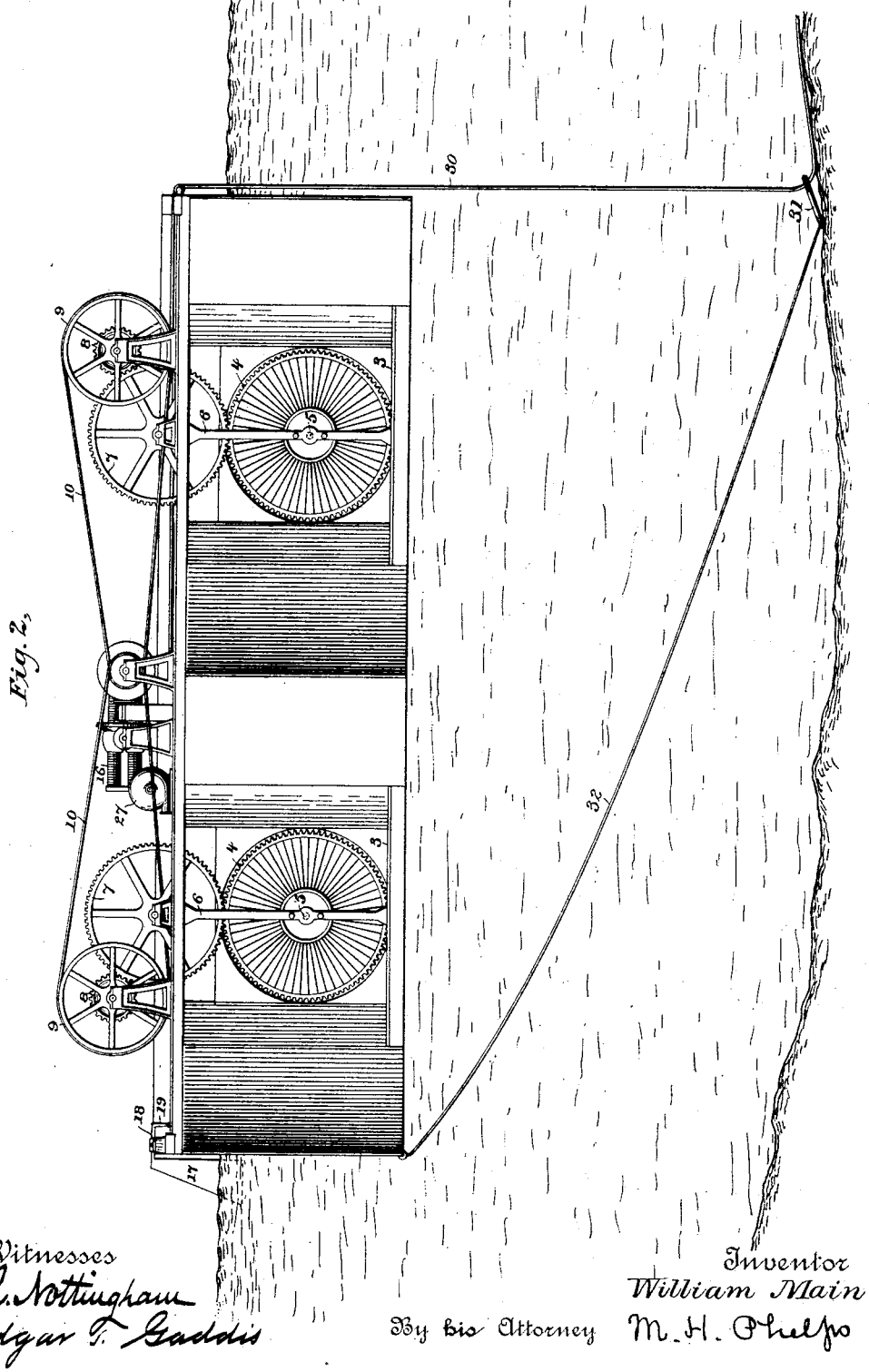

WILLIAM MAIN, OF BROOKLYN, NEW YORK, ASSIGNOR TO THE RIVER AND RAIL ELECTRIC LIGHT COMPANY, OF OHIO COUNTY, WEST VIRGINIA.

CURRENT-MOTOR FOR DYNAMO-ELECTRIC MACHINES.

SPECIFICATION forming part of Letters Patent No. 328,418, dated October 13, 1885.

Application filed July 21, 1885. Serial No. 172,240. (No model.)

*To all whom it may concern:*

Be it known that I, WILLIAM MAIN, a citizen of the United States, residing in Brooklyn, county of Kings, State of New York, have invented a new and useful Improvement in Current-Motors for Dynamo-Electric Machines, of which the following is a specification.

In current-motors it is a matter of great importance that the wheel or power mechanism should be capable of adjustment for different depths of water in order that it may be so placed as to receive at all times the greatest amount of available current force. This is specially true of screw-wheels, the power of which is proportionate to the amount of immersion, and it is also to a considerable extent true of all other forms of water-power mechanism. The difficulty heretofore experienced in adjusting floating water-powers to different depths of water has been the disarrangement thereby of the power-transmitting connection with the shore; but in the form of apparatus with which my invention is concerned this obstacle does not exist for the reason that the power is transmitted to shore in the form of electricity over flexible conductors, and the vertical movement of the float which is necessary in this adjustment does not in any way interfere with the proper action of said connection. I have shown, as a means of securing proper adjustment of the float in the water, water-tight compartments and valves and pumps for causing water to enter and removing water from said compartments, as desired. I do not limit myself to the use of compartments in this arrangement, but the entire hold of the float may be used as a water-reservoir to secure for the wheels a proper amount of immersion.

My invention further consists in an arrangement whereby, when floats of this character are driven by currents which flow alternately in opposite directions, as tidal currents, the dynamo may be driven continuously in the same direction. This is obviously an end important to be accomplished where currents of this character are utilized, as otherwise reversal in the direction of motion of the dynamo would be necessary, and also the electric connections with the dynamo would have to be reversed in order to maintain a continuous current in the working-circuit in the same direction.

My invention further consists in providing means for causing the shore cable to drop directly from the float to the bottom of the stream instead of following its normal curve. It is obvious that where current-motors of this description are used in navigable streams it will frequently be necessary for steamboats and other vessels to pass near the floats, and if the cables were suspended at that point above the bottom of the river they would be liable to be struck and cut or dragged out by the keels of passing boats; and my invention has for its object the providing of means to avoid this danger.

The form of my current-motor and the devices used in connection therewith, above referred to, are shown in the accompanying drawings, in which—

Figure 1 is a plan view of the float. Fig. 2 is an end view of the same.

The float is essentially a box-frame built in such a manner as best to combine lightness with strength. It is decked over and planked water-tight on the sides and bottom. In Fig. 1 nearly one-half of the deck is broken away so as to expose the construction below. Lines of uprights 1 1, bolted to the longitudinal timbers above and below, afford support for planking 2 2, which forms the side of the double cone or pyramid shaped water-ways extending completely through the float from front to back. Planking 3, nailed to the upper side of the bottom longitudinal timbers, prevents the water, which comes in at the open mouth of the water-ways and is confined between their converging walls, from escaping downward before acting on the wheel. The wheel 4 is placed at the center of the float, where the two converging water-wheels meet, and is of the screw-propelling type, resembling the American form of windmill. The blades of the wheel are flat, and the wheel is therefore operated equally well by currents moving in each direction. The shaft 5 of the wheel is parallel with the longitudinal axis of the water-ways, and is supported by bearings in suitable uprights, 6 6, secured above and below to the heavy longitudinal timbers of the float. A circumferential cogged gear communicates motion of the water-wheel to gear-wheel 7, which in turn gears with pinion 8, fastened to the shaft of band-wheel 9, from which, by means of belts 10, motion is communicated to the shaft 11. This shaft carries a bevel-gear, 12, which meshes with the pinion 13, attached to a shaft on which is mounted one part of the motion-reversing friction-clutch 14. The cones and connecting-cylinder, forming the other part of this friction gear, are mounted upon the axis 15 of a dynamo-electric machine, 16. The object of this motion-reversing gear is to enable the dynamo to receive a continuous motion in the same direction from the wheel, notwithstanding the reversals in the direction of motion of the wheel due to the reversals in the direction of a tidal current. This reversing-gear may, if desired, be operated by hand; but in order to avoid the necessity of a watchman on the float for the purpose of shifting the reversing-gear at the time of a change in the tide, I have devised an automatic apparatus for accomplishing this result, which is operated by the current of the water itself. This apparatus consists, essentially, of a fan-shaped depending-piece, 17, the lower part of which dips into the stream, and which is carried by a horizontal arm, 18, journaled to the deck of the float, and having at its other end a crank-arm, 19, which engages with an arm of the bell-crank 20, to the other arm of which is pivoted a rod, 21, connected at its other end by a pivot to one arm of a second bell-crank, 22. To the other arm of this latter bell-crank is flexibly connected the lower arm of a lever, 23, pivoted near its center, and the upper arm of which engages with the sleeve carrying the double cones, which form one part of the friction motion-reversing clutch above described. The details of the construction of this cone-carrying cylinder and its connections with the lever 23 are not shown, this being a device of common use in machinery and not requiring further explanation.

The operation of this part of my invention is as follows: After the current has ceased to propel the wheel in one direction, the first movement of the water in the opposite direction, while it is too slight to give motion to the wheel, will operate upon the fan 17 and cause it to act through the intermediate bell-crank levers and rod 21 to reverse the position of the cone-carrying cylinder, so that when the wheel begins to turn and communicates motion through the intermediate gearing to the dynamo the shaft of the latter will rotate in the same direction as it did before the reversal of the current. It will be noted that this construction has great advantage over any reversing device, which depends for its operation upon the reversed motion of the power mechanism itself in that it shifts the reversing-clutch before the reversed motion begins, and thus avoids any preliminary backward movement of the dynamo.

Wings, doors, or wedge-shaped frames 24 24 are attached to the body of the float by hinges or other convenient means. These devices are intended to divide the current sharply at the entrance of the water-ways, having the effect both of widening their mouths and preventing eddies. Doors of this sort can be securely braced open, as shown in Fig. 1, and be made to close over the entrance of the water-ways while the float is being towed into position. The two water-ways shown in the drawings divide the float into three separate boat-like divisions. Each of these divisions is again divided into compartments by water-tight partitions. Each of these subdivisions or compartments is provided with a valve, 25, for the admission of water, and also with means for pumping this water out as required.

In Figure 1 two partitions, 26 26, are shown in each division of the float, thus forming in each division three separate compartments. A centrifugal pump, 27, driven from a band-pulley on shaft 11 is connected with a pipe, 28, which sends a branch to the bottom of each compartment. Valves 29 29 regulate the suction, allowing the action of the pump to be thrown upon a single compartment or distributed among all.

With the compartments empty the float will draw but little water, and in this condition may be easily launched and towed over bars. When anchored in a suitable spot, water is to be admitted into each compartment in such quantity as to cause the float to settle evenly in the water and submerge the wheel. In case of leakage a single compartment may be emptied and caulked from within. In case of collision the float would not be sunk by the entire filling of a single compartment. In low water the float may be allowed to ground itself and still at any time be floated off. It may also be found desirable for various purposes to tilt the float, and this can be done by proper use of these water-tight compartments. Thus it may at times be advantageous to tilt down the front end in order to cause the bottom planking to act as a deflecting-surface, or to tilt either end out of the water in order to set out or take in the deflecting-doors 24. So, too, it may be desirable to tilt one of the wheels out of the stream for repairs while the other continues to operate.

I have shown a screw-wheel mounted upon the float, and, so far as I am aware, I am the first to use a wheel of this kind upon a floating support to drive a dynamo-machine; and for this purpose a screw-wheel is by far the most advantageous form. An undershot wheel is always adapted for use in water of a certain depth, and its power is lessened rather than increased by greater immersion. A screw-wheel, however, will yield results through a wide range of degrees of immersion nearly proportional to the superficial area of the blades immersed. Owing to the rapidly-changing conditions of water stage and the changes in location of current in most of the great rivers of this country, a floating wheel which can utilize without loss different depths of water has a very great advantage over one which cannot, since the high degree of flexibility and easy expansibility of electrical connections permits a floating motor, the power of which is transmitted to shore in the form of electricity, to be readily moved whenever it is desired to make use of a more available portion of the current. It is plain that for similar reasons there is a special value in the use of means for regulating the degree of the immersion of the float when a screw-wheel, as contrasted with an undershot wheel, is used.

In Fig. 2 I have illustrated the means which I have devised for securing a square drop of the cable to the bottom of the stream when it leaves the float. The cable 30 passes over a friction-roller, or any equivalent friction-reducing device, at the edge of the float, and is then drawn through a ring, 31, of such weight as to hold it upon the bottom of the stream. The ring is fastened by a cord, 32, to some portion of the float, and by adjusting the length of the cord the direction taken by the cable when it leaves the float may be determined. If desired, the ring may, for greater safety of the cable, be drawn under the float; or the cable may leave the float from between the water-ways instead of at the side of the float, which probably would be the preferable arrangement.

While I have shown the three sections of the boat as subdivided by partitions, I do not limit myself to this construction, but may omit the partitions and control the amount of immersion of the float by admitting water to or exhausting water from one or more of said divisions.

I do not confine myself to the particular form of reversing-clutch shown, as many other of the well-known devices for accomplishing this result in common use would be equally serviceable herein. Nor do I limit myself to the particular means of reversing the position of the clutch automatically, as others which would be mere equivalents of my construction might readily be devised.

The means of securing a direct drop of the cable from the float which I have shown is a form which I prefer; but I do not limit myself to that form, since equivalent devices—as, for instance, a rod fixed upon the float in such a manner that it could be adjusted up and down and having at its lower end a friction device for carrying the cable—might be used.

Under the term "dynamo-electric machine," as used in this specification and claims, I intend to include every kind of device by means of which dynamic or mechanical energy can be converted into electrical energy.

While I have shown and described my apparatus in connection with the flexible cable for conducting the current generated to shore, it is within my contemplation to dispense with the shore-connection when desired, and to either utilize the electricity generated upon the float itself or to convey it to shore as stored-up energy by the use of storage-batteries. I propose to use, in connection with my improved float and apparatus connected therewith, all forms of water-motors, as well as the particular form of screw-motors shown herein.

I claim—

1. The combination of a water-power mechanism, a floating support therefor anchored or otherwise secured in the stream, a dynamo-electric machine mounted on said support and driven by said water-power mechanism, a flexible cable for conveying the current of said dynamo to shore, and means for regulating the draft of said floating support, whereby the immersion of the water-power mechanism in the current may be governed at will.

2. The combination of a water-power mechanism, a floating support for the same provided with one or more water-tight compartments in its hold, means for permitting the flow of water into said compartments and for exhausting the same, a dynamo-electric machine driven by said water-power mechanism, and electric conductors for conveying the current generated by the dynamo to shore, substantially as described, and for the purpose set forth.

3. The combination of a water-power mechanism, a floating support therefor provided with one or more water-tight compartments, valves for regulating the admission of water into said compartments, a pump communicating with the said compartments for exhausting the same, a dynamo-electric machine mounted on said floating support and driven by said water-power mechanism, and electrical conductors for conveying the current generated by the dynamo to shore, substantially as described, and for the purpose set forth.

4. The combination of a floating current-motor, a dynamo-electric machine driven thereby, a flexible cable for conveying the electricity generated by the dynamo to shore, and a guide for the cable connected with the float for insuring a vertical drop of the cable to the bottom of the stream.

5. The combination of a floating current-motor, a dynamo-electric machine driven thereby, a flexible cable for conveying the electricity generated by the dynamo to shore, and a weight flexibly attached to the float and connected with the cable, so as to carry it to the bottom of the stream near the float.

6. The combination of a floating current-motor, a dynamo-electric machine driven thereby, a flexible cable for conveying the electricity generated by the dynamo to shore, and a weight attached by a cord or chain to the float, said weight being provided with an opening through which the cable passes, substantially as described, and for the purpose set forth.

7. The combination of a floating power mechanism capable of being propelled by a current flowing in either direction, a dynamo-electric machine driven thereby, and a motion-reversing mechanism between said power mechanism and the shaft of said dynamo, whereby motion of the dynamo in one direction may be maintained notwithstanding reversals in the direction of the water-current.

8. The combination of a floating power mechanism capable of being propelled by a current flowing in either direction, a dynamo-electric machine driven thereby, and automatic motion-reversing mechanism between said power mechanism and the shaft of said dynamo, whereby motion of the dynamo in one direction may be maintained notwithstanding reversals in the direction of the water-current.

9. The combination of a water-power mechanism, a floating support therefor, a dynamo-electric machine driven by said power mechanism, a motion-reversing clutch between said power mechanism and the shaft of said dynamo, and a lever, one end of which is immersed in the stream and the other connected through intermediate mechanism with said reversing-clutch, whereby the current is effective, when it turns, to throw said clutch, substantially as described and shown.

10. The combination of a water-power mechanism, a floating support therefor, similar converging water-ways of approach on each side of said power mechanism, a dynamo-electric machine driven by said power mechanism, a motion-reversing clutch for said dynamo, and a flexible electrical conductor resting upon the bottom of the stream, substantially as described, and for the purpose set forth.

11. The combination of a screw-wheel, a floating support therefor, means for regulating the draft of said floating support, a dynamo-electric machine driven by said wheel, and a flexible conducting-cable connecting said dynamo to shore.

12. The combination of a screw-wheel, a floating support therefor, one or more water-tight compartments in said floating support, and means for introducing water into and exhausting water from said compartments, a dynamo-electric machine driven by said wheel, and a flexible conducting-cable connecting said dynamo to shore.

13. The combination of a water-power mechanism, a floating support therefor anchored or otherwise secured in the stream, a dynamo-electric machine mounted upon said support and driven by said water-power mechanism, a working-circuit for said dynamo, and means for regulating the draft of said floating support, whereby the immersion of the water-power mechanism in the current may be governed at will.

14. The combination of a screw water-power mechanism, a floating support therefor anchored or otherwise fixed in the stream, a dynamo-electric machine located upon said support and driven by said water-power mechanism, and a flexible electrical conductor lying along the bottom of the stream for conveying the electricity generated by the dynamo to shore.

15. The combination of a water-power mechanism, a floating support therefor provided with a water-way of approach converging throughout its length, in the narrowest part of which water-way the water-power mechanism is placed, means for regulating the draft of the said floating support, a dynamo-electric machine also mounted upon the floating support and driven by the power mechanism, and a flexible electrical conductor resting upon the bottom of the stream for conveying the current generated by the dynamo to shore.

16. A current-power float provided with one or more diverging water-ways of discharge or exit adapted to prevent the escape of water in any direction except that of the current, in combination with a water-power mechanism placed at the commencement of each diverging water-way and completely filling the narrowest portion of the same, means for regulating the draft of the said float, a dynamo-electric machine mounted upon the float and driven by the power mechanism, and a flexible electrical conductor resting upon the bottom of the stream for conveying the current generated by the dynamo to shore.

17. A current-power float provided with one or more converging water-ways of approach, each connected with a diverging water-way of discharge or exit, in combination with a water-power mechanism placed at the narrowest part and junction of said water-ways and completely filling the channel of communication, means for regulating the draft of said float, a dynamo-electric machine mounted upon the float and driven by the water-power mechanism, and a flexible electrical conductor resting upon the bottom of the stream for conveying the current generated by the dynamo to shore.

18. A current-power float provided with converging-water ways of approach and diverging water-ways of discharge connected with each other at their narrowest parts, the said ways of approach and discharge being of similar construction, so that the ways of approach might be used as ways of discharge and the ways of discharge as ways of approach, in combination with a water-power mechanism placed at the junction of said water-ways and completely filling the same, means for regulating the draft of said float, a dynamo-electric machine mounted upon the float and driven by the water-power mechanism, and a flexible electrical conductor resting upon the bottom of the stream for conveying the current generated by the dynamo to shore, substantially as described and shown.

19. A current-power float provided with a converging water-way of approach and a diverging water-way of discharge communicating therewith, in combination with a water-power mechanism placed between the said water-ways, means for regulating the draft of said float, a dynamo-electric machine mounted upon the float and driven by said water-power mechanism, and a flexible electrical conductor for conveying the current generated by the dynamo to shore, said electrical conductor resting upon the bottom of the stream, substantially as described and shown.

20. A current-power float provided with one or more converging water-ways of approach, in combination with a water-power mechanism placed in the narrowest part of each of said water-ways, water-tight compartments provided with means for filling and emptying the same for regulating the draft of the float in the water, a dynamo-electric machine mounted upon the float and driven by the water-power mechanism, and an electrical circuit for the dynamo, substantially as described and shown.

21. A current-power float provided with converging water-ways of approach, in combination with screw water-power mechanisms placed in the throats of the same, a dynamo-electric machine mounted upon the float, and a flexible electrical conductor resting upon the bottom of the stream for conveying the current generated by the dynamo to shore.

22. A current-power float provided with converging water-ways of approach and diverging water-ways of discharge joined to each other at their narrowest parts, in combination with a screw water-power mechanism placed at the junction of said water-ways, a dynamo-electric machine mounted upon the float, and a flexible electrical conductor resting upon the bottom of the stream for conveying the current generated by the dynamo to shore.

23. The combination of a floating current-motor, a dynamo electric machine mounted thereon and driven thereby, a flexible cable for conveying the electricity generated by the dynamo to shore, and a guide for said cable, whereby the path taken by it through the water is controlled, substantially as described and for the purpose set forth.

In testimony whereof I subscribe my name in the presence of two witnesses.

WILLIAM MAIN.

Witnesses:
EDWARD M. IVES,
F. F. RANDOLPH.